United States Patent
Sakuma et al.

(10) Patent No.: US 10,656,326 B2
(45) Date of Patent: May 19, 2020

(54) OPTICAL FIBER

(71) Applicant: SUMITOMO ELECTRIC INDUSTRIES, LTD., Osaka-shi, Osaka (JP)

(72) Inventors: Hirotaka Sakuma, Osaka (JP); Yoshiaki Tamura, Osaka (JP); Yuki Kawaguchi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/512,534

(22) Filed: Jul. 16, 2019

(65) Prior Publication Data

US 2020/0024182 A1  Jan. 23, 2020

(30) Foreign Application Priority Data

Jul. 17, 2018  (JP) ................ 2018-134096

(51) Int. Cl.
  *G02B 6/02* (2006.01)
  *G02B 6/036* (2006.01)

(52) U.S. Cl.
  CPC .......... *G02B 6/02* (2013.01); *G02B 6/03627* (2013.01); *C03C 2201/11* (2013.01); *C03C 2201/12* (2013.01); *C03C 2201/30* (2013.01)

(58) Field of Classification Search
  None
  See application file for complete search history.

(56) References Cited

U.S. PATENT DOCUMENTS

| | | | | |
|---|---|---|---|---|
| 2003/0221459 A1* | 12/2003 | Walczak | .......... | C03B 37/01446 65/398 |
| 2006/0137398 A1* | 6/2006 | Bleaking | ............. | C03B 19/1453 65/17.3 |
| 2007/0297735 A1* | 12/2007 | Khrapko | .......... | C03B 37/01446 385/127 |
| 2013/0129291 A1* | 5/2013 | Hoshino | ............ | G02B 6/02042 385/123 |
| 2016/0304392 A1* | 10/2016 | Bookbinder | .............. | C03C 3/06 |
| 2017/0205574 A1* | 7/2017 | Emslie | .................. | C03B 37/025 |
| 2017/0369359 A1* | 12/2017 | Baierl | ....... | C03B 20/00 |
| 2018/0362392 A1* | 12/2018 | Sakuma | ................ | C03C 13/046 |
| 2019/0324195 A1* | 10/2019 | Sakuma | ................ | C03B 37/027 |

FOREIGN PATENT DOCUMENTS

| | | |
|---|---|---|
| EP | 2518546 A1 | 10/2012 |
| GB | 2574317 A | 12/2019 |
| JP | 2002-053344 A | 2/2002 |
| JP | 2009-541796 A | 11/2009 |
| JP | 2017-76053 A | 4/2017 |
| WO | WO-2007/149344 A1 | 12/2007 |

* cited by examiner

*Primary Examiner* — Michael Stahl
(74) *Attorney, Agent, or Firm* — Faegre Drinker Biddle & Reath LLP

(57) ABSTRACT

An optical fiber in which the increase of attenuation can be reduced is offered. An optical fiber is made of silica glass and includes a core and a cladding enclosing the core. The refractive index of the cladding is smaller than that of the core. The core includes chlorine and any of the alkali metal group. The chlorine concentration is 1 ppm or more in the whole region of the core. In the whole region of the core, the absolute value of rate of radial change of the chlorine concentration is smaller than 2000 ppm/μm.

10 Claims, 6 Drawing Sheets

FIG. 3

| | Average K concentration [ppm] | Max. slope of chlorine concentration [ppm/μm] | α 1.55 [dB/km] | Core diameter [μm] | Cutoff wavelength [nm] | Aeff [μm2] | Radial position of max. chlorine concentration [μm] | Core average chlorine concentration [ppm] | Core average Fluorine concentration [ppm] |
|---|---|---|---|---|---|---|---|---|---|
| FIBER A | 29 | 10 | 0.146 | 13.5 | 1483 | 151 | 1.7 | 627 | 1997 |
| FIBER B | 29 | 101 | 0.145 | 13.5 | 1503 | 149 | 1.8 | 628 | 1928 |
| FIBER C | 29 | 310 | 0.144 | 14.0 | 1517 | 151 | 1.9 | 603 | 2021 |
| FIBER D | 29 | 504 | 0.145 | 13.6 | 1511 | 151 | 1.9 | 585 | 2114 |
| FIBER E | 32 | 708 | 0.146 | 13.9 | 1489 | 151 | 2.3 | 601 | 2209 |
| FIBER F | 29 | 1075 | 0.148 | 14.1 | 1500 | 152 | 1.6 | 614 | 2109 |
| FIBER G | 29 | 1583 | 0.150 | 13.5 | 1485 | 151 | 1.7 | 601 | 2168 |
| FIBER H | 28 | 2039 | 0.152 | 13.9 | 1499 | 151 | 1.8 | 625 | 2127 |
| FIBER I | 30 | 2614 | 0.155 | 14.1 | 1486 | 148 | 1.7 | 608 | 2129 |
| FIBER J | 32 | 3134 | 0.157 | 13.6 | 1491 | 148 | 1.5 | 602 | 2109 |
| FIBER K | 30 | 105 | 0.149 | 13.9 | 1508 | 150 | 11.5 | 600 | 2055 |
| FIBER L | 28 | 108 | 0.146 | 13.5 | 1511 | 150 | 1.6 | 627 | 530 |
| FIBER M | 32 | 104 | 0.145 | 13.6 | 1513 | 150 | 1.9 | 599 | 1040 |
| FIBER N | 29 | 103 | 0.146 | 13.6 | 1516 | 148 | 1.5 | 590 | 3803 |
| FIBER O | 31 | 107 | 0.149 | 13.7 | 1491 | 148 | 1.8 | 618 | 5532 |
| FIBER P | 28 | 106 | 0.151 | 13.6 | 1483 | 148 | 1.8 | 597 | 6598 |

OPTICAL FIBER

FIELD OF THE INVENTION

The present disclosure relates to an optical fiber.

BACKGROUND ART

Generally, if alkali metal or alkaline-earth-metal element is contained in the core of an optical fiber preform consisting of silica glass, the attenuation caused by Rayleigh dispersion of an optical fiber will decrease because the viscosity of the core is reduced and the re-arrangement of glass is facilitated while the optical fiber preform is drawn into the optical fiber. Hereinafter, both of the alkali metal element and the alkaline-earth-metal element are called the "alkali metal group."

If the core which contains an alkali metal group does not contain chlorine (or contains only low concentration of chlorine), the attenuation will be increased because glass defects occur as the connection in glass molecular structure is broken when the alkali metal group elements added to the central part of the core in the state of optical fiber preform spread during fiber-drawing. If the core contains sufficient quantity of chlorine, the attenuation caused by glass defects will decrease because the occurrence of glass defects is restrained as the chlorine fills the glass defects caused by diffusion of the alkali metal group.

In order to reduce the increase of attenuation caused by such glass defect, the core of optical fibers disclosed in Tokuhyo No. 2009-541796 (Patent Document 1) and Tokukai No. 2017-76053 (Patent Document 2) contains chlorine in addition to the alkali metal group. When the core is divided into inner core and outer core in the optical fiber disclosed by Patent Document 1, the minimum chlorine concentration of the inner core is 0 to 100 mol ppm, and the maximum chlorine concentration of the outer core is 500 mol ppm or more. In the optical fiber disclosed by Patent Document 2, the chlorine concentration of the inner core is 0 to 1000 mol ppm, and that of the outer core is 4000 mol ppm or more.

In either of Patent Documents 1 and 2, the chlorine concentration of the inner core is smaller than that of the outer core. Thus, it is thought that the increase of the attenuation due to glass defects can be restrained since a lower concentration of the chlorine in the inner core to which the alkali metal group is added restrains crystallization while a higher concentration of the chlorine in the outer core restores the glass defect caused during fiber-drawing.

SUMMARY OF THE INVENTION

Means for Solving the Problem

The optical fiber of this disclosure consists of silica glass and contains a core and a cladding. The cladding encloses the core and has a refractive index smaller than the refractive index of the core. The core contains chlorine as well as an alkali metal or an alkaline-earth-metal element. In the whole region of the core, the chlorine concentration is 1 ppm or more, and the absolute value of rate of radial change in the chlorine concentration is smaller than 2000 ppm/μm.

In this disclosure, the "concentration" is expressed in terms of "mass fraction" (the ratio of mass of each component relative to the mass of the whole glass) unless otherwise specifically mentioned. The rate of radial change of the chlorine concentration is defined as the slope (value of coefficient a) of linear function formula ar+b which approximates the chlorine concentration N(r) at a distance r from the fiber axis within the range of 1 μm and the coefficients of which is determined by a least-squares method.

BRIEF DESCRIPTION OF DRAWINGS

FIG. 3 is a table for summarizing the specifications of each of the 16 sorts of optical fibers A to P which were manufactured and evaluated.

PREFERRED EMBODIMENTS

If two-layer structure is formed with respect to the profile of chlorine concentration in the core of an optical fiber as disclosed in Patent Documents 1 and 2, the difference in the level of chlorine concentration will occur between the inner core and the outer core. Since distortion arises near such level difference in the chlorine concentration, and the attenuation increases due to the distortion, it is difficult to reduce the increase of attenuation of an optical fiber. This disclosure offers an optical fiber in which the increase of attenuation can be reduced.

Hereinafter, in the explanation of drawings, the same mark is applied to an identical element, and the duplication of explanation will be omitted. The present invention should not be limited to the embodiments, and the invention is shown by the scope of claims. It is intended that all modifications within the meaning and scope of equivalents to the claims should be included in the scope of the invention.

Figure 1:
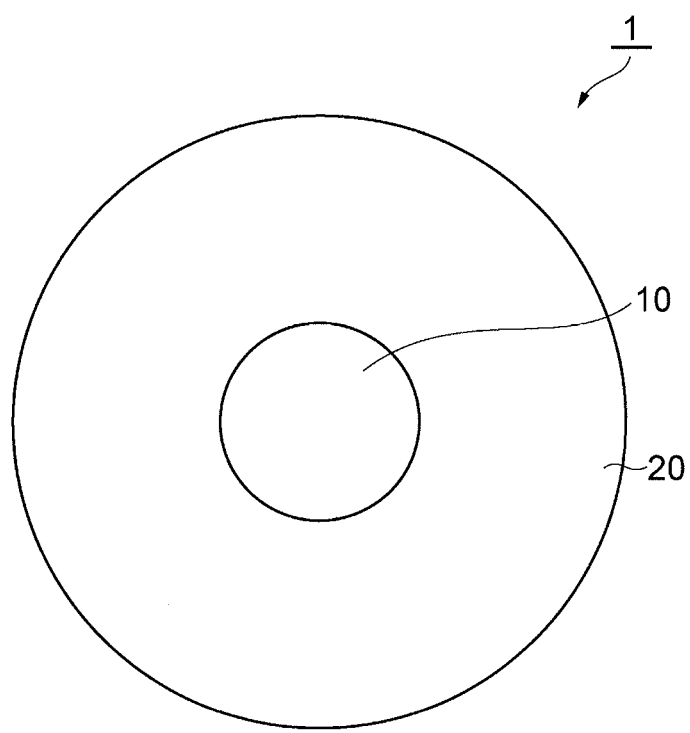
FIG. 1 shows a cross-section of an optical fiber of the present disclosure.

FIG. 1 shows the cross-section of an optical fiber 1 of the present disclosure. The optical fiber 1 is made of silica glass and includes a core 10 and a cladding 20 enclosing the core 10. The refractive index of the cladding is smaller than that of the core 10. The core 10 includes chlorine and any of the alkali metal group. The chlorine concentration is 1 ppm or more in the whole region of the core 10. In the whole region of the core 10, the absolute value of rate of radial change of the chlorine concentration is smaller than 2000 ppm/μm. In such optical fiber 1, the increase of attenuation can be reduced.

The method for measuring chlorine concentration is as follows, for example. After grinding an end face perpendicular to the axis of an optical fiber, the chlorine concentration is measured with an electron beam micro analyzer (EPMA: Electron Probe Micro Analyzer) at each position along a straight line passing through the central position of the end of the optical fiber. As for the conditions of measurement by EPMA, for example, the accelerating voltage is 20 kV, the diameter of a probe beam is 1 μm or less, and the measurement interval is 100 nm or less. The measuring method for the concentration of other elements is also the same.

In the optical fiber 1, the absolute value of the rate of radial change in the chlorine concentration of the whole region of the core 10 is preferably less than 1000 ppm/μm, more preferably less than 500 ppm/μm, and most preferably less than 300 ppm/μm. In the whole region of the core 10, the absolute value of the rate of radial change in chlorine concentration is preferably larger than 100 ppm/μm, and more preferably larger than 200 ppm/μm.

In the optical fiber 1, preferably the core 10 contains fluorine. It is possible to lower the viscosity and to reduce attenuation by making the core to contain fluorine. The average fluorine concentration in the core 10 is preferably 500 to 4000 ppm. If the fluorine is not added to the core, the viscosity is not sufficiently lowered and the attenuation cannot be reduced. On the other hand, if the fluorine is added by 4000 ppm or more, there may occur a case in which the reduction of attenuation cannot be achieved because the amount of attenuation increment due to concentration fluctuation exceeds the amount of attenuation reduction due to decrease of viscosity.

In the optical fiber 1, preferably the average value of the concentration of the alkali metal group in the core 10 is 0.2 to 200 ppm. Preferably, the average value of the concentration of the alkali metal group is 0.2 ppm or more in order to make the attenuation at the wavelength of 1550 nm to be 0.160 dB/km or less. Preferably, the average value of the concentration of the alkali metal group is 200 ppm or less in order to restrain occurrence of crystallization. Preferably, the core 10 contains, as the alkali metal group, one or more elements selected from a group consisting of sodium, potassium, rubidium, cesium, and calcium.

Figure 2:
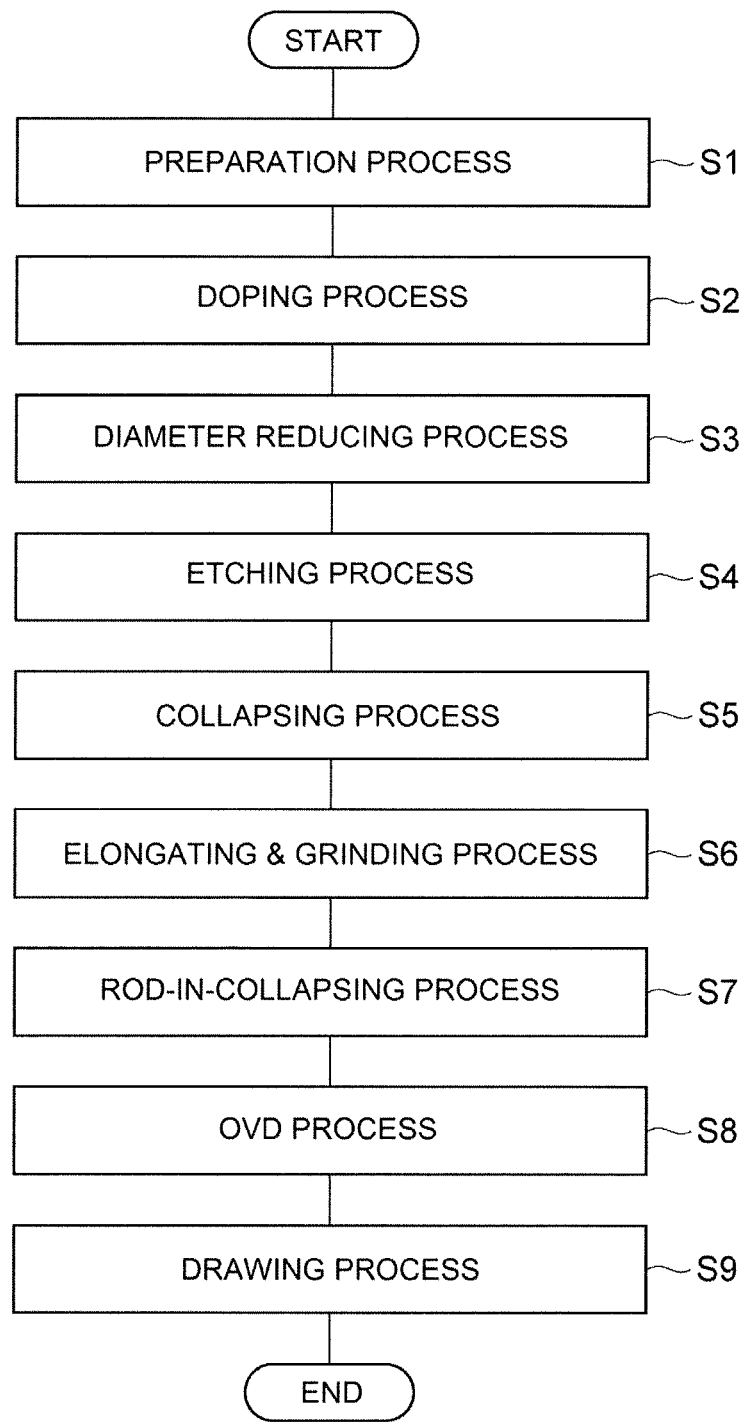
FIG. 2 is a flow-chart for explaining a method of manufacturing the optical fiber of FIG. 1.

FIG. 2 is a flow chart for explaining a method of manufacturing an optical fiber. In the following, an explanation is described about an example of concrete conditions. An optical fiber is produced through the following processes in the enumerated order: Preparation process (Step S1), Doping process (Step S2), Diameter reducing process (Step S3), Etching process (Step S4), Collapsing process (Step S5), Elongating & grinding process (Step S6), Rod-in-collapsing process (Step S7), OVD process (Step S8), and Drawing process (Step S9).

In the preparation process (Step S1), a silica glass pipe into which alkali metal elements (dopant), etc. are to be doped is prepared. The silica glass rod from which the silica glass pipe is formed contains a certain concentration of chlorine and fluorine of 500 to 4000 ppm, and the concentration of the other dopants and impurities is 10 ppm or less. The outer diameter of this silica glass pipe is 30 to 40 mm, and the inner diameter is 15 to 25 mm. The concentration herein mentioned is a concentration defined by formula (1):

$$\frac{2\int_0^c F(r) \cdot r \cdot dr}{c^2} \quad (1)$$

in the case of fluorine concentration F(r) at the position of radius r. The letter "c" represents the radius of a silica glass rod from which a glass pipe is formed. The concentration is measured by EPMA as in the case of a fiber, for example. The measurement conditions may differ from those of a fiber, provided that the concentration is computed using the calibration curve in each condition. Since the chlorine concentration differed respectively among plural number of optical fibers manufactured, the average core chlorine concentration in an optical fiber state is separately summarized herein later in the Table.

In the doping process (Step S2), a potassium (K) element as a dopant of the alkali metal group is added to the inner surface of the silica glass pipe. Potassium bromide (KBr) of 6 to 10 g is used as a material. This material is heated to a temperature of 750° C. to 850° C. with an outside heat source in order to generate the vapor of material. While introducing the material-vapor into the inside of the silica glass pipe together with a career gas consisting of oxygen having a flow of 1 SLM (1 liter/min as converted under the conditions of 0° C. 101.325 kPa), the silica glass pipe is heated from outside with an oxy-hydrogen burner so that the outer surface of the glass pipe may have a temperature of 1600° C. to 1800° C. In such case, the burner is traversed at a speed of 30 to 60 mm/min for a total of 10 to 15 turns so that the inner surface of the silica glass pipe may be diffused with the K element.

In the diameter reducing process (Step S3), the diameter of the K-added silica glass pipe is reduced. In such case, while oxygen of 0.5 to 1.0 SLM is flowed inside the silica glass pipe, the silica glass pipe is heated with an outside heat source so that its outer surface may have a temperature of 2000° C. to 2300° C. The outside heat source is traversed in total 6 to 10 turns for heating until the silica glass pipe has an inner diameter of 3 to 6 mm.

In the etching process (Step S4), the etching is performed on the inside face of the silica glass pipe. In such case, a vapor-phase etching is performed by heating the silica glass pipe with an outside heat source while introducing the mixed gas of $SF_6$ (0.2 to 0.4 SLM) and chlorine (0.5 to 1.0 SLM) into the inside of the silica glass pipe. In this way, the inside face of the pipe which contains a high concentration of impurities added with the intended dopants can be eroded and thereby the impurities can be removed.

In the collapsing process (Step S5), the silica glass pipe is collapsed to solid body. In such collapsing step, the silica glass pipe 30 is collapsed by making the temperature of the surface to be 2000° C. to 2300° C. while introducing a mixed gas of oxygen (0.1 to 0.5 SLM) and helium (0.5 to 1.0 SLM) into the inside of the silica glass pipe and decompressing the absolute pressure inside the silica glass pipe to 97 kPa or less. By such collapsing, a core part (outer diameter: 20 to 30 mm) is obtained as a rod. A core layer which does not contain the alkali metal, etc. may be applied on the outside of the rod by a well-known method, such as outside vapor deposition (OVD) method or a collapsing method.

In the elongating & grinding process (Step S6), the core part is elongated to have a diameter of 20 to 25 mm, and further its perimeter is grinded so that the diameter may be 15 to 20 mm. This part will become the core of an optical fiber.

In the rod-in-collapsing process (Step S7), a first cladding part is provided on the outside of the core part. In such case, the rod-in-collapsing method is used: that is, the core part is inserted into the inside of the silica glass pipe containing fluorine, and both the core part and the pipe are unified to make a rod by heating with an outside heating source. The difference between the refractive index of the core part and the refractive index of the first cladding part is about 0.34% at the maximum relative to the refractive index of pure silica glass. As a result of unification of the core part and the pipe by such rod-in-collapsing method, the amount of moisture of the core part and the neighboring first cladding part can be controlled to a sufficiently low level.

In the OVD process (Step S8), the rod made by unifying the core part and the first cladding part is elongated to have a given diameter, and thereafter a second cladding part containing fluorine is formed by the OVD method on the outside of the rod, so that an optical fiber preform is produced.

In the drawing process (Step S9), an optical fiber is produced by drawing an optical fiber preform made by the above-mentioned method for producing an optical fiber preform. The drawing speed is 1,800 m/min to 2,300 m/min, and the drawing tension is 0.5N.

FIG. 3 is a table showing the specifications for each of 16 sorts of optical fibers (A to P) which was manufactured and evaluated. The table shows, for each of optical fibers A to P, the average K concentration (ppm) of the whole core, the maximum rate of radial change (ppm/μm) in the chlorine concentration of the core, the attenuation $\alpha_{1.55}$ (dB/km) at the wavelength of 1550 nm, the core diameter (μm), the cutoff wavelength (nm), the effective area Aeff (μm$^2$) at the wavelength of 1550 nm, the radial position (μm) of the maximum chlorine concentration, the average chlorine concentration (ppm) of the whole core, and the average fluorine concentration (ppm) of the whole core.

Figure 4:
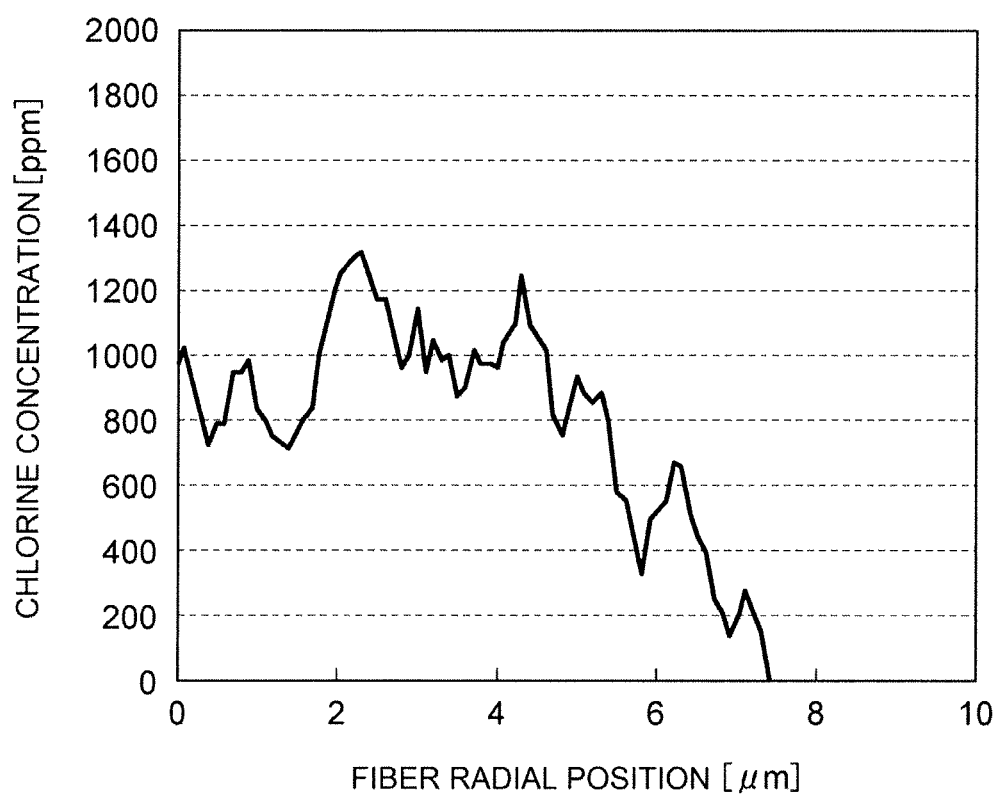
FIG. 4 is a graph showing the radial profile of chlorine concentration of the optical fiber E.

FIG. 4 is a graph showing the profile of chlorine concentration in the radial direction of an optical fiber E. In the optical fiber E, the maximum of the rate of change in the chlorine concentration in the radial direction was 708 ppm/μm.

Figure 5:
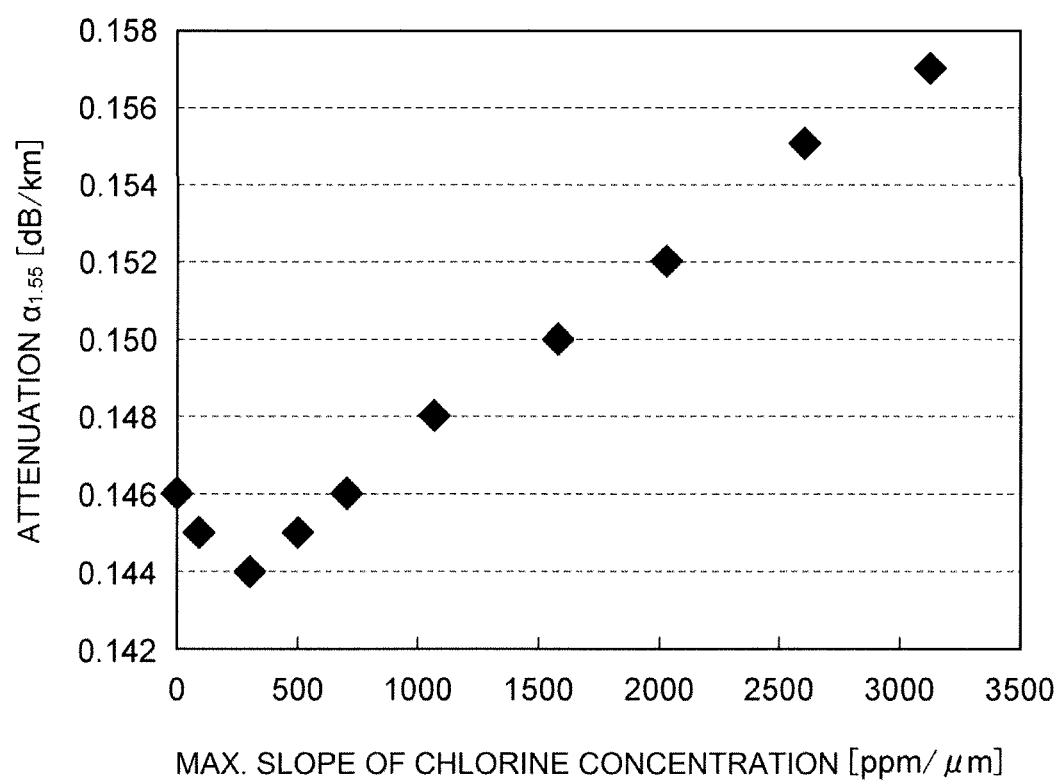
FIG. 5 is a graph in which relations between the attenuation $\alpha_{1.55}$ (dB/km) at 1550 nm wavelength and the maximum rate (ppm/um) of the radial change of chlorine concentration are plotted with respect to each of the optical fibers A to J.

FIG. 5 shows a graph in which the attenuation $\alpha_{1.55}$ (dB/km) at the wavelength of 1550 nm and the maximum (ppm/μm) of the rate of radial change in chlorine concentration are plotted with respect to each of optical fibers A to J. From this graph, it is recognized that the attenuation $\alpha_{1.55}$ has a tendency to be the minimum when the maximum rate of radial change in chlorine concentration is about 300 ppm/μm.

Figure 6:
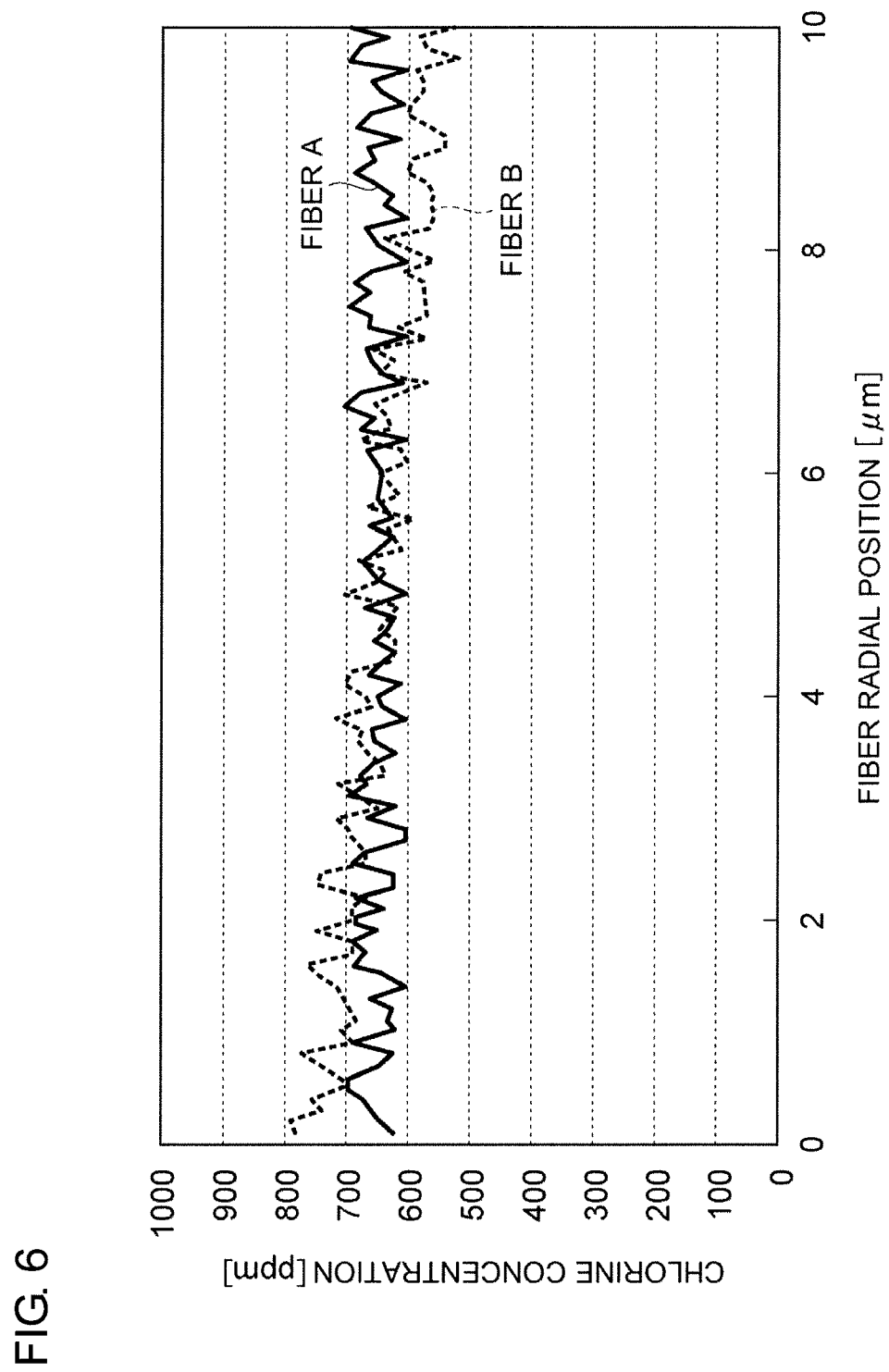
FIG. 6 is a graph showing the respective radial profile of chlorine concentration of optical fibers A and B.

FIG. 6 shows the radial profile of chlorine concentration of each of optical fibers A and B. Although the maximum value of rate of radial change in chlorine concentration of the optical fiber B is larger than that of the optical fiber A, the chlorine concentration is larger in the central domain (i.e., domain in one half of the radius of the core) where the K concentration is considered to be larger and the attenuation $\alpha_{1.55}$ of the optical fiber B is smaller than that of the optical fiber A. This is because the attenuation can be restrained since the Cl, which fills a glass defect caused when the alkali metal group spread at the time of drawing, in the core central domain containing the alkali metal group restores the defect effectively. Generally, the smaller the maximum radial rate of change in chlorine concentration, the smaller the attenuation. However, it can be said that the attenuation will not necessarily become minimum even if the maximum radial rate of change in chlorine concentration is made 0 ppm/μm in order to minimize the increase of attenuation due to distortion.

The attenuation is also dependent on the concentration of the alkali metal group contained in the core. However, it is considered that such influence is small in the optical fibers A to P because the concentration of the alkali metal group is unified to about 30 ppm.

The attenuation is also dependent on the respective average concentration of chlorine and fluorine contained in the core. However, it is considered that in the optical fibers A to K such influence is small because the chlorine concentration is unified to about 600 ppm and the fluorine concentration is unified to about 2000 ppm.

The addition of fluorine is important to lower the viscosity of a core. However, the optimal fluorine concentration is about 500 to 4000 ppm in view of the optical fibers B, K, L, M, N, O, and P, in which the maximum slope of chlorine concentration is about 100 ppm/μm. If the fluorine concentration is more than that, the attenuation will be increased by concentration fluctuation.

On the other hand, when the optical fiber B is compared with the optical fiber K, it can be said that the attenuation will be relatively small in the case where the maximum chlorine concentration is located within the central domain (domain within one half of the radius of the core) of the core even if the maximum radial rate of change in chlorine concentration is comparatively on the same level. In this case, also, it is considered that the attenuation is restrained as the chlorine fills a glass defect and the defect is restored efficiently when the alkali metal group spread at the time of drawing.

EXPLANATION OF MARKS

1—optical fiber, 10—core, 20—cladding.

What is claimed is:

1. An optical fiber made of silica glass and containing a core and a cladding,
   the cladding enclosing the core and having a refractive index smaller than the refractive index of the core,
   the core containing chlorine as well as an alkali metal or an alkaline-earth-metal element,
   the core having a chlorine concentration of 1 ppm or more in the whole region thereof, and
   the absolute value of rate of radial change in the chlorine concentration being smaller than 2000 ppm/μm.

2. An optical fiber as set forth in claim 1, wherein
   the absolute value of the rate of radial change in the chlorine concentration of the whole region of the core is less than 1000 ppm/μm.

3. An optical fiber as set forth in claim 1, wherein
   the absolute value of the rate of radial change in the chlorine concentration of the whole region of the core is less than 500 ppm/μm.

4. An optical fiber as set forth in claim 1, wherein
   the absolute value of the rate of radial change in the chlorine concentration of the whole region of the core is less than 300 ppm/μm.

5. An optical fiber as set forth in claim 1, wherein
   the absolute value of the rate of radial change in the chlorine concentration of the whole region of the core is more than 100 ppm/μm.

6. An optical fiber as set forth in claim 1, wherein
   the absolute value of the rate of radial change in the chlorine concentration of the whole region of the core is more than 200 ppm/μm.

7. An optical fiber as set forth in claim 1, wherein
   the core contains fluorine.

8. An optical fiber as set forth in claim 7, wherein
   the average fluorine concentration in the core is 500 to 4000 ppm.

9. An optical fiber as set forth in claim 1, wherein
   the average value of the concentration of alkali metal or alkaline-earth-metal element in the core is 0.2 to 200 ppm.

10. An optical fiber as set forth in claim 1, wherein the core contains, for alkali metal or alkaline-earth-metal element, one or more elements selected from a group consisting of sodium, potassium, rubidium, cesium, and calcium.

* * * * *